(12) United States Patent
Hsu

(10) Patent No.: US 11,020,937 B2
(45) Date of Patent: Jun. 1, 2021

(54) IMPACT-RESISTANT PAD

(71) Applicant: DEYORK LTD., New Taipei (TW)

(72) Inventor: Hung Hsiang Hsu, Taipei (TW)

(73) Assignee: DEYORK LTD., New Taipei (TW)

(*) Notice: Subject to any disclaimer, the term of this patent is extended or adjusted under 35 U.S.C. 154(b) by 197 days.

(21) Appl. No.: 16/155,289

(22) Filed: Oct. 9, 2018

(65) Prior Publication Data

US 2019/0255808 A1    Aug. 22, 2019

(51) Int. Cl.
| | |
|---|---|
| *B32B 3/02* | (2006.01) |
| *B32B 7/05* | (2019.01) |
| *B32B 27/06* | (2006.01) |
| *B32B 27/40* | (2006.01) |

(52) U.S. Cl.
CPC .............. *B32B 7/05* (2019.01); *B32B 27/065* (2013.01); *B32B 27/40* (2013.01); *B32B 2266/0278* (2013.01); *B32B 2307/558* (2013.01)

(58) Field of Classification Search
CPC ....... A47C 27/085; A47C 27/088; B32B 5/16; B32B 5/18; B68G 1/00; B68G 5/00; B68G 5/02; B68G 11/04

USPC ......... 428/306.6, 308.4, 320.2, 321.1, 322.7; 2/411, 413
See application file for complete search history.

(56) References Cited

U.S. PATENT DOCUMENTS

| | | | |
|---|---|---|---|
| 2008/0263772 A1* | 10/2008 | Chiu ........................ A47C 4/54 |
| | | | 5/654 |
| 2009/0077723 A1* | 3/2009 | Mead ................... A47C 27/085 |
| | | | 2/455 |

OTHER PUBLICATIONS

Clearco Silicone Oil Website, http://www.clearcoproducts.com/pure-silicone-low-viscosity.html, available Sep. 9, 2017, accessed Jun. 18, 2020 (Year: 2017).*

* cited by examiner

*Primary Examiner* — Zachary M Davis
(74) *Attorney, Agent, or Firm* — Rabin & Berdo, P.C.

(57) ABSTRACT

A pad comprises a first sheet, a second sheet and a cushion. The outer periphery of the second sheet is attached to the first sheet, making a closed accommodation space between the first sheet and the second sheet for being filled with cushions. The cushion comprises a plurality of cushions with various phases and those cushions contact each other, so that energy is absorbed during collision or impact by means of multiple cushions with various phases simultaneously.

3 Claims, 6 Drawing Sheets

| Temperature： | 24.8°C 48%RH |
|---|---|
| Standard： | EN 14120 |
| Max Peak[N]： | 6000 |
| Min Energy[J]： | 25 |

| Group | Height [cm] | Impact Point | Anvil Shape | Speed [m/s] | Peak [N] | Energy [J] |
|---|---|---|---|---|---|---|
| 1 | 108 | 1 | R25mm | 4.53 | 31826 | 25.6 |
| 1 | 108 | 1 | R25mm | 4.53 | 32095 | 25.6 |
| 1 | 108 | 1 | R25mm | 4.56 | 30295 | 26.0 |
| 2 | 108 | 1 | R25mm | 4.53 | 25984 | 25.6 |
| 2 | 108 | 1 | R25mm | 4.51 | 25728 | 25.5 |
| 2 | 108 | 1 | R25mm | 4.55 | 24657 | 25.8 |
| 3 | 108 | 1 | R25mm | 4.55 | 23750 | 25.8 |
| 3 | 108 | 1 | R25mm | 4.53 | 23370 | 25.6 |
| 3 | 108 | 1 | R25mm | 4.53 | 22805 | 25.6 |
| 4 | 108 | 1 | R25mm | 4.53 | 21582 | 25.6 |
| 4 | 108 | 1 | R25mm | 4.53 | 21055 | 25.6 |
| 4 | 108 | 1 | R25mm | 4.51 | 21659 | 25.5 |
| 5 | 108 | 1 | R25mm | 4.53 | 20698 | 25.6 |
| 5 | 108 | 1 | R25mm | 4.55 | 20835 | 25.8 |
| 5 | 108 | 1 | R25mm | 4.55 | 21551 | 25.8 |
| 6 | 108 | 1 | R25mm | 4.50 | 12486 | 25.3 |
| 6 | 108 | 1 | R25mm | 4.51 | 11223 | 25.5 |
| 6 | 108 | 1 | R25mm | 4.51 | 13506 | 25.5 |
| 7 | 107 | 1 | R25mm | 4.50 | 16142 | 25.3 |
| 7 | 107 | 1 | R25mm | 4.53 | 14048 | 25.6 |
| 7 | 107 | 1 | R25mm | 4.51 | 18011 | 25.5 |
| 8 | 107 | 1 | R25mm | 4.51 | 15866 | 25.5 |
| 8 | 107 | 1 | R25mm | 4.51 | 16185 | 25.3 |
| 8 | 107 | 1 | R25mm | 4.50 | 16185 | 25.3 |

FIG. 5

IMPACT-RESISTANT PAD

FIELD OF THE INVENTION

The present disclosure relates to an impact-resistant pad, and more particularly, to an impact-resistant pad arranged with a plurality of various cushion materials inside.

BACKGROUND OF THE INVENTION

A pad has a variety of uses in industry, sometimes for sealing the pipeline, sometimes for being set among mechanical components to absorb vibration energy during operation, and sometimes for being set between contents and housing to absorb the energy impact on the housing to protect the contents.

However, it's quite common to see an impact-resistant pad mostly composed of a uniform single material. Although different cushioning materials can be selected according to the requirements of comfort or energy absorbing ability, the internal cushion materials can be divided into liquids or solids; wherein, when the cushioning material is a solid material such as cotton, foam, rubber, silica gel or latex, it will lose original elasticity and deform after long-term use, and even lose the ability to absorb the energy of impact; when the cushioning material is a liquid, general common liquids, besides not having as good effect of absorbing energy as conventional solid materials do, inside a pad will escape from a small hole to make the pad's function lost/lowered once the small hole is formed at any place of the pad or the sealing is not complete.

SUMMARY OF THE INVENTION

The main purpose of the present invention is to provide an impact-resistant pad, which can absorb energy during collision or impact by means of multiple cushion materials with various phases simultaneously. Thus, a human body is protected and an object avoids crashing.

To achieve above purpose, the present invention provides an impact-resistant pad comprising a first sheet, a second sheet and a cushion.

The outer periphery of the second sheet is attached to the first sheet, and a closed accommodation space is formed between the first sheet and the second sheet; the cushion sealed inside the accommodation space comprises a plurality of cushion materials with various phases and the cushion materials contact with each other.

Wherein, as for the cushion materials in one preferable embodiment, the cushion materials include: solid cushion, liquid cushion and vapor cushion.

As for property of the cushion, wherein the density of the cushion is within a range of 0.1~0.7 (g/cm$^3$); the impact protection is within a range of 3.9~32 (kN); the water absorption is within a range of 0%~8%; preferably, the density is within a range of 0.4~0.7 (g/cm$^3$), the impact protection is within a range of 3.9~5.5 (kN) and the water absorption is less than 4%.

The kinematic viscosity of the liquid cushion is within a range of 7.5~35, preferably within a range of 24~28.

As for the detailed form of the solid cushion, in one preferable embodiment, the entire shape of the solid cushion is made as an elastic sheet having a dimension smaller than volume of the accommodation space, and there is a space retained between at least one side of the elastic sheet and a interior surface the accommodation space, forming at least one gap located in the interior of the accommodation space to make the solid cushion be able to move inside the accommodation space.

In another embodiment, the entire form of the solid cushion is constructed by a plurality of particles, and the particles can move relatively each other when the impact-resistant pad encounters stresses to deform.

In addition to the entire form, as for the interior structure, the solid cushion is made as a spongy structure in one preferable embodiment and the liquid cushion or the vapor cushion could be stored in the holes within the spongy structure, which ensure that when the impact-resistant pad encounters stresses, the liquid cushion moves among the holes in the spongy structure to generate a damping-like effect and thus to achieve a function of absorbing energy.

Furthermore, in the preferable embodiment, the liquid cushion substantially has the same volume as the total capacity of the holes, which makes the liquid cushion substantially stay within spongy structure when the liquid cushion in the impact-resistant pad does not encounter stresses.

As for the first sheet and the second sheet, in one preferable embodiment, a surface on at least one of the first sheet and the second sheet in the accommodation space forms a recess zone, and then the solid cushion substantially stays at the center of the accommodation space when the impact-resistant pad does not encounter stresses.

Furthermore in the preferable embodiment, at least one of the first sheet and the second sheet is a cushioning sheet and the material or the structure of the cushioning sheet is different from the material or the structure of the cushion materials in the accommodation space, which makes the impact-resistant pad absorbing impact energy during impact by means of multiple various impact-resistant materials or structures.

As can be seen from above description, the present invention features cushioning effect brought by cushion materials with three types of phases in an accommodation space inside the impact resistant pad. And in preferable embodiments, a solid cushion also is constructed by a spongy structure for absorbing a liquid cushion, which makes the partial liquid cushion can enter the spongy structure. Therefore, when the impact-resistant pad encounters stresses the liquid cushion in the spongy structure is squeezed out and generates damping-like function; furthermore, as for the detailed form of the solid cushion, the entire shape of the solid cushion is made as an elastic sheet having a dimension smaller than volume of the accommodation space or particles, and there is a space retained between at least one side of the elastic sheet and an interior surface of the accommodation space, forming at least one gap located in the interior of the accommodation space to make the solid cushion be able to move inside the accommodation space.

BRIEF DESCRIPTION OF THE DRAWINGS

To more clearly illustrate embodiments of the application or technical solutions in the prior art, drawings to be used in the description of the embodiments of the application or the prior art will be briefly introduced hereinafter. Apparently, the drawings in the description below are merely some embodiments of the disclosure, a person skilled in the art can obtain other drawings according to these drawings without creative efforts. In the figures:

FIG. 2A is a schematic illustrating section view according to the embodiment of

FIG. 1;

FIG. 5 is a schematic illustrating experiment result for the embodiment in FIG. 1, FIG. 3A and other embodiments.

DETAILED DESCRIPTION OF PREFERRED EMBODIMENTS

In order to further understand the structure, usage and features of the present disclosure more clearly, the present disclosure is described in detail below with references to the accompanying drawings and specific preferred embodiments.

Figure 1:
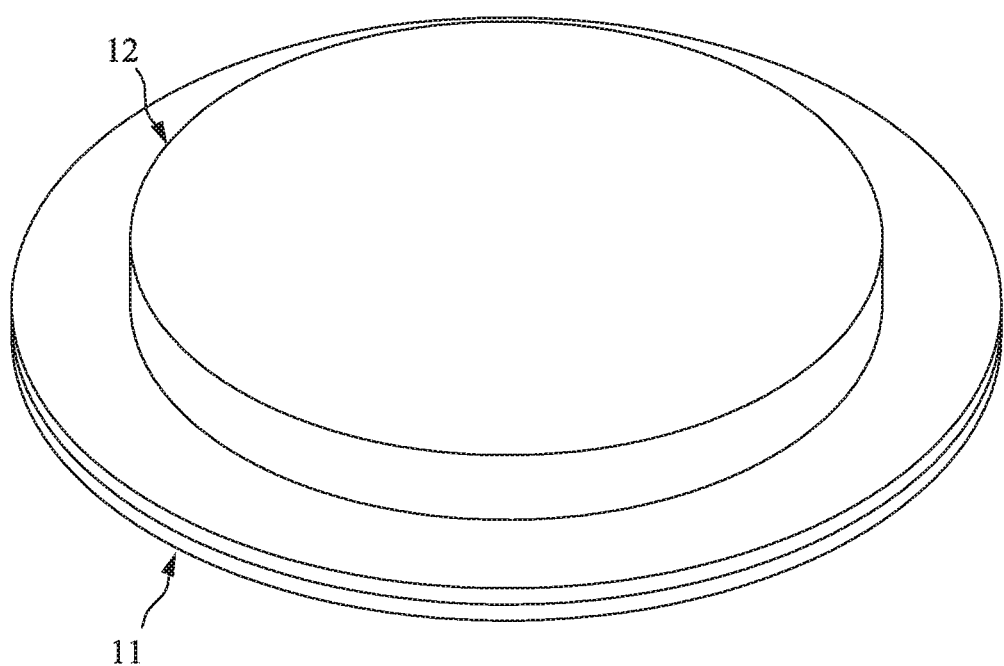
FIG. 1 is a schematic illustrating three dimensional view of the impact-resistant pad of the present invention.
Figure 2A:
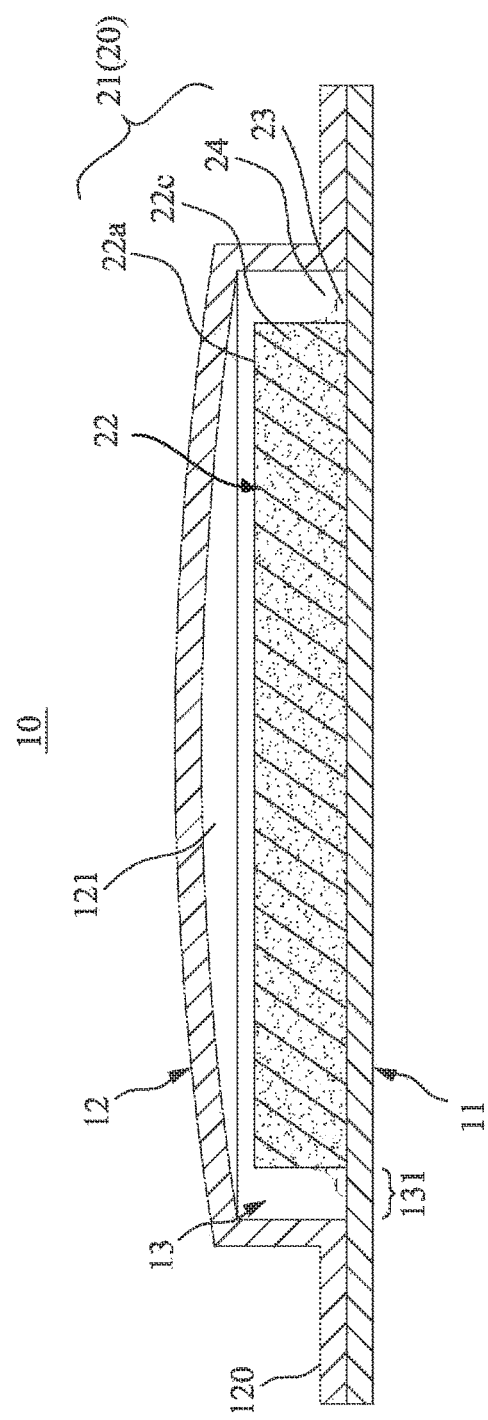
Figure 2B:
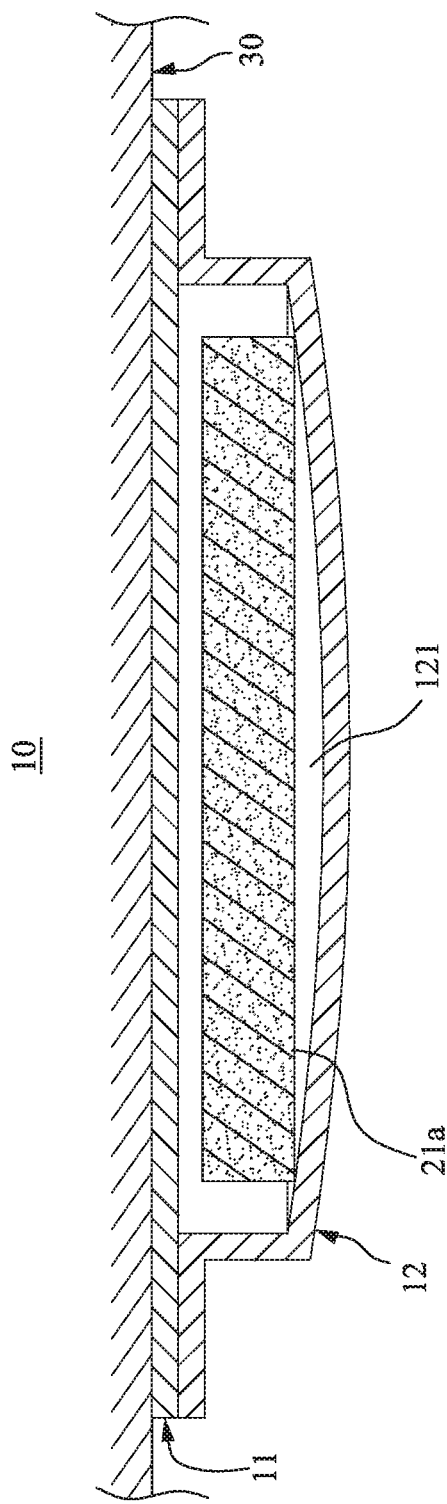
FIG. 2B is a schematic illustrating section view of the impact-resistant pad mounted on an object in the practical case according to the embodiment of FIG. 2A.
Figure 2C:
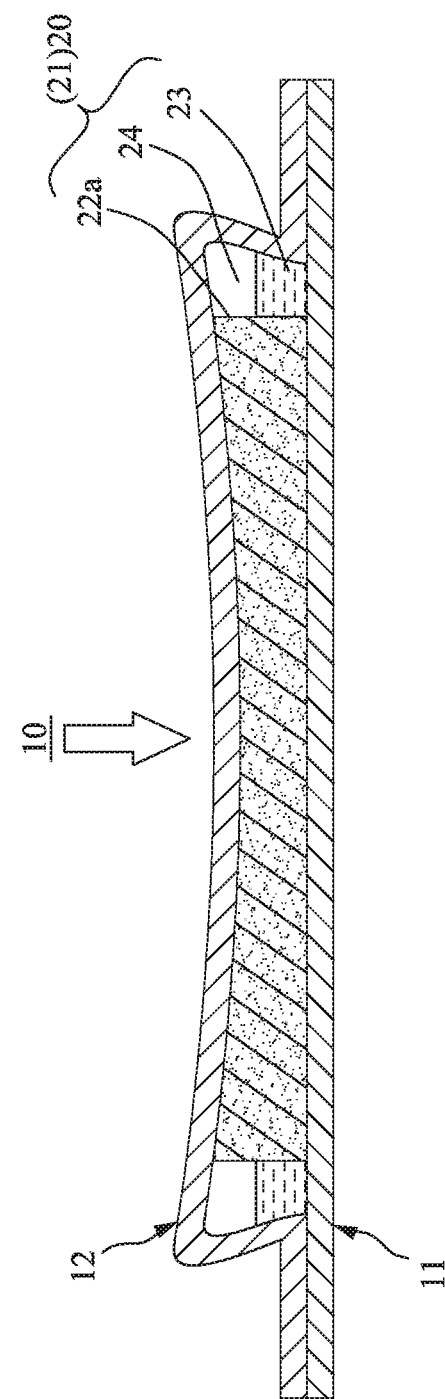
FIG. 2C is a schematic illustrating section view of the impact-resistant pad encountering stresses according to the embodiment of FIG. 2A.

Please refer to FIGS. 1 to 2C. FIGS. 1 and 2A are schematic illustrating appearance and sectional view of an impact-resistant pad 10 of the present invention according to a preferable embodiment. The impact-resistant pad 10 in the present embodiment includes a first sheet 11, a second sheet 12 and a cushion 20.

In the present embodiment, the first sheet 11 and the second sheet 12 are cushioning sheets, and the material component (not for structure, as described in detail later) of the cushioning sheet is the same as that of a solid cushion included in the cushion 20 in an accommodation space 13. Through the high frequency welding, the outer periphery 120 of the second sheet 12 and the outer periphery 110 of the first sheet 11 are attached with each other, further making a closed accommodation space 13 between the first sheet 11 and the second sheet 12 for sealing the cushion 20 inside.

Wherein, the cushion 20 includes a plurality of cushion materials 21 with various phases. More specifically, the cushion materials 21 includes: solid cushion 22, liquid cushion 23 and vapor cushion 24. Additionally, the cushion materials 21 with various phases contact with each other.

As for detailed material types, in the present embodiment, the solid cushion 22 is TPU-based foam board with a spongy structure 22c, which is not like the first sheet 11 and the second sheet 12 made of uniformly solid material of TPU (Thermoplastic Polyurethane). Density of the TPU-based foam board is within a range of 0.1~0.7 (test standard in accordance with ISO 845 2009, with a unit of g/cm$^3$), impact protection is within a range of 3.9~32 (test standard in accordance with EN 1621 at 10 J, with a unit of kN) and water absorption is within a range of 0%~8% (test standard in accordance with ISO Method 1); preferably, the density is within a range of 0.4~0.7 (g/cm$^3$), the impact protection is within a range of 3.9~5.5 (kN) and the water absorption is less than 4%. The liquid cushion 23 is a cosmetics grade white mineral oil, wherein a kinematic viscosity of the mineral oil is within a range of 7.5~35 (by GB265 testing) and the flash point of the mineral oil is within a range of 140~180° C.; its preferable viscosity is within a range of 24~28; while the vapor cushion 24 is air.

Wherein as shown in FIG. 2A, the solid cushion 22 in the present embodiment is made as an elastic sheet 22 having a dimension smaller than volume of the accommodation space 13, and there is a space retained between at least one side of the elastic sheet 22a and an interior surface of the accommodation space 13, forming at least one gap 131 located in the interior of the accommodation space 13 to make the solid cushion 22 be able to move inside the accommodation space 13.

As shown in FIG. 2B, in practical use, when the impact-resistant pad 10 is mounted on an object 30 (e.g., a safety helmet), the gap 131 makes the solid cushion 22 be able to move inside the accommodation space 13. Thus in order to make the solid cushion 22 uniformly acted on by force during impact, in the accommodation space 13, a center of a surface away from the object 30 on the second sheet 12 forms a recess zone 121, which makes the solid cushion 22 encounter the surface tension of the cushioning liquid when the impact-resistant pad 10 does not encounter stresses. And further because of the shape effect of the recess zone 121, the solid cushion 22 substantially stays at the center of the accommodation space 13; wherein, the way of attachment between the impact-resistant pad 10 and the object 30 may similarly be high frequency welding or adhesive bonding or otherwise to make the impact-resistant pad 10 fixed on the object 30.

Furthermore, the solid cushion 22 in the present embodiment, in addition to its appearance in a form of the elastic sheet 22a, like previous description, there are plenty of holes inside the solid cushion 22 to construct the spongy structure 22c. Therefore, the liquid cushion 23 or the vapor cushion 24 could be stored in the holes; furthermore in the present embodiment, the liquid cushion 23 substantially has the same volume as the total capacity of the holes, which makes the liquid cushion 23 substantially stay at the holes of the spongy structure 22c when the liquid cushion 23 in the impact-resistant pad 10 does not encounter stresses.

As shown in FIG. 2C, the accommodation space 13 is compressed when the impact-resistant pad 10 encounters stresses. Like previous mentioned, besides absorbing partial impact energy by the first sheet 11 and the second sheet 12 as a cushioning sheet, and compressing the accommodation space 13 to squeeze the air, partial energy presses the elastic sheet 22a when the elastic sheet 22a starts to be compressed. The cosmetics grade white mineral oil (the liquid cushion 23) and the air (the vapor cushion 24) stored in the holes inside the elastic sheet 22a are also squeezed. Furthermore, when the cosmetics grade white mineral oil move among holes and leave the elastic sheet 22a, such a design of a viscous fluid flowing through the small holes can further absorb the impact energy; wherein, because of the accommodation space 13 is a sealed space, when the accommodation space 13 is compressed, the liquid cushion 23 and the vaper cushion 24 are simultaneously affected by pressure.

Wherein, there is no limitation in the present invention about the materials of the first sheet 11 and the second sheet 12, the detailed form and materials of the solid cushion 22 and a shape of the impact-resistant pad 10. Therefore please refer to FIGS. 3A, 3B and 4, in another embodiment, materials of the cushioning sheet constructed by the first sheet 11 and the second sheet 12 still can be TPU, while the solid cushion 22 can be changed to silica gel (in other embodiments, EPP (Expanded Poly-Propylene) or TPE (Thermoplastic Elastomer)). And the form of the solid cushion 22 can yet alternatively be constructed by plenty of particles 22b filled within the accommodation space 13. As for quantity and volume, there may also be holes between adjacent the particles and the gap 131 between the particles 22b and the wall surface of the accommodation space 13; Thus, when the impact-resistant pad 10 is pressed to deform, the particles 22b can move relatively each other and squeeze the cosmetics grade white mineral oil in the holes during moving; alternatively in one embodiment, appearance of the impact-resistant pad 10 can be made as a shape of hexagon shown in FIG. 4.

Figure 3A:
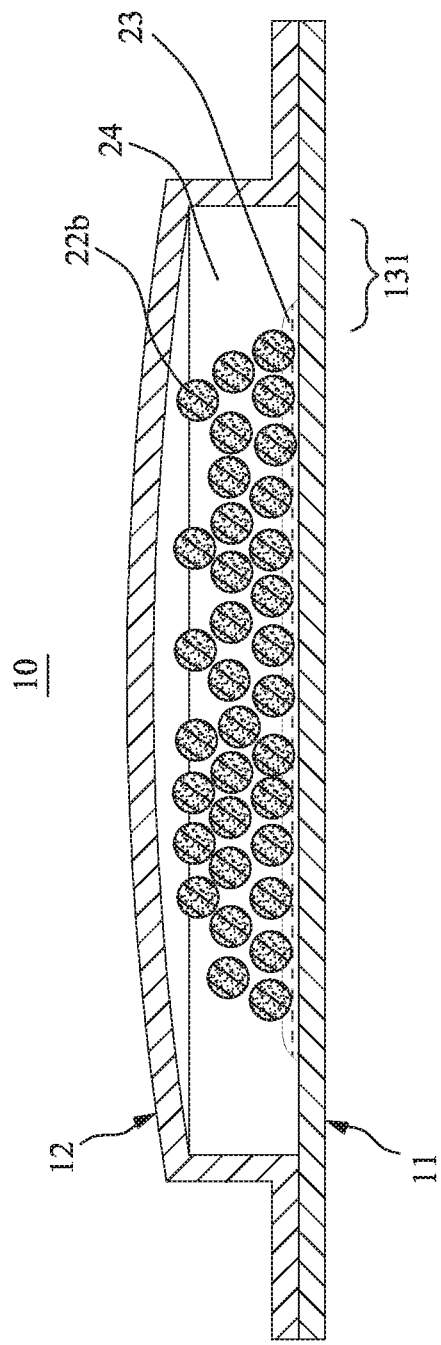
FIG. 3A is a schematic illustrating section view of the impact-resistant pad according to another embodiment of the present invention.
Figure 3B:
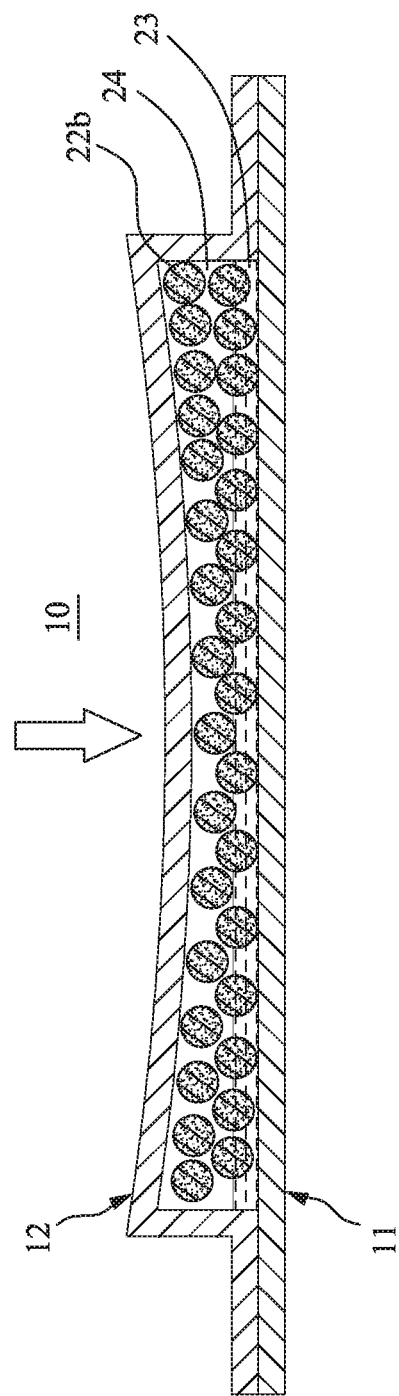
FIG. 3B is a schematic illustrating section view of encountering stresses according to the embodiment of FIG. 3A.
Figure 4:
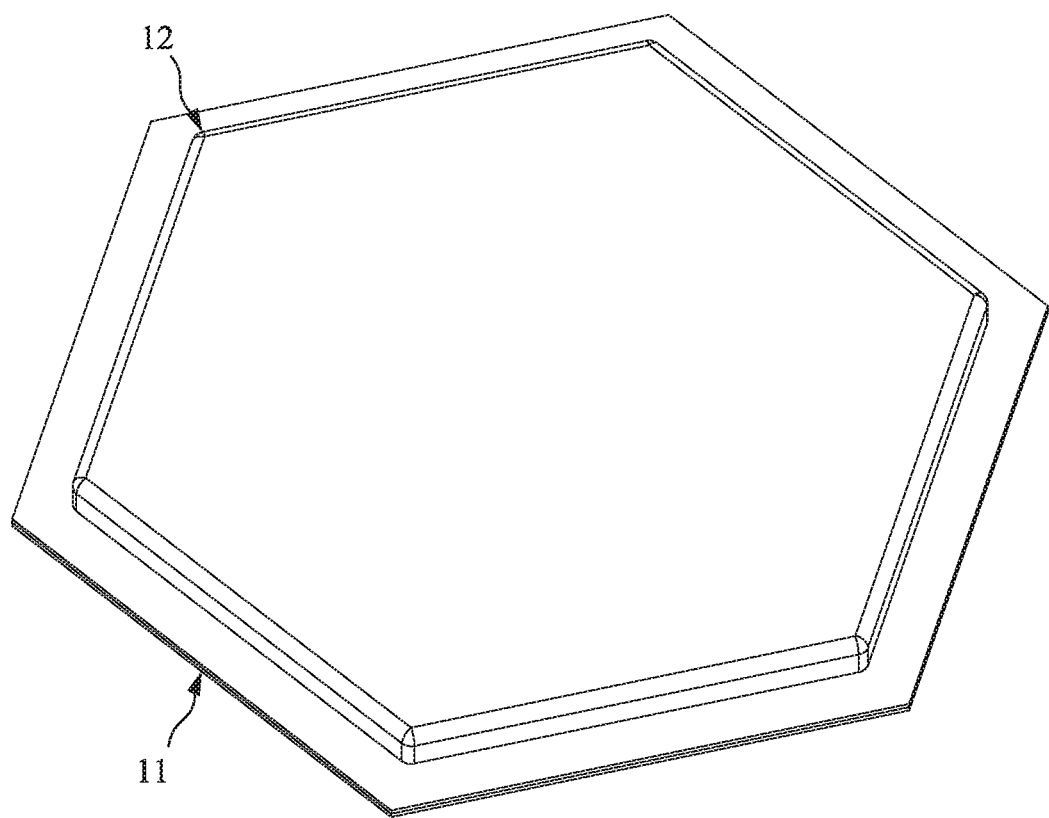
FIG. 4 is a schematic illustrating three dimensional view of the impact-resistant pad according to another embodiment.

At last, as for performance comparison of a pad between present structure design in above two embodiments and conventional design, please refer to FIG. 5. FIG. 5 is a schematic illustrating experiment result for testing the impact-resistant pad 10 according to various embodiments (the shape is the same as a hexagon shown in FIG. 4) of the present invention in accordance with the standard EN14120. Wherein, in the table, the comparison is through three times testing conducted on each different sample. And the content of separate group is as follows:

First group 31: a pad sample is only made of TPU; second group 32: a pad sample is only made of silica gel; third group 33: both the first sheet 11 and the second sheet 12 are made of TPU, and then enclose the mineral oil to make a pad sample; fourth group 34: both the first sheet 11 and the second sheet 12 are made of TPU, and then enclose particles made of EPP and the mineral oil to make a pad sample; fifth group 35: both the first sheet 11 and the second sheet 12 are made of TPU, and then enclose particles made of TPE and the mineral oil to make a pad sample; sixth group 36: both the first sheet 11 and the second sheet 12 are made of TPU, and then enclose the TPU with the spongy structure 22c and the mineral oil to make a pad sample (i.e., the embodiment of FIG. 1); seventh group 37: both the first sheet 11 and the second sheet 12 are made of TPU, and then enclose a silica gel board and the mineral oil to make a pad sample; eighth group 38: both the first sheet 11 and the second sheet 12 are made of TPU, and then enclose particles made of silica gel and the mineral oil to make a pad sample (i.e., the embodiment of FIG. 3A and FIG. 3B).

As can be seen from FIG. 5, under the same test method, the impact-resistant pad according to the embodiment of FIG. 1 or FIG. 3A has actually better performance on the effect of absorbing impact energy compared to conventional one made of single material or one only enclosing the mineral oil.

The above-mentioned embodiments are used for conveniently describing the present invention, not further to limit it. For the person skilled in the art of the disclosure, without departing from the concept of the disclosure, simple modifications or changes can be made according to the claims and description of the present invention and should be included in the protection scope of the disclosure.

What is claimed is:

1. A impact-resistant pad comprising:
   a first sheet;
   a second sheet, wherein an outer periphery of the second sheet is attached to the first sheet, and a closed accommodation space is formed between the first sheet and the second sheet; and
   a cushion sealed inside the accommodation space, wherein the cushion comprises a plurality of cushion materials with various phases and the cushion materials with various phases contact with each other;
   wherein the cushion materials comprise a solid cushion, a liquid cushion and a vapor cushion, the solid cushion is made as a spongy structure and the liquid cushion is stored in holes within the spongy structure; the liquid cushion has substantially a same volume as a capacity of the holes, which forms a damping structure and makes the liquid cushion substantially stay within the spongy structure when the impact-resistant pad does not encounter stresses and the liquid cushion leave the spongy structure when the solid cushion in the impact-resistant pad encounters stresses;
   wherein the solid cushion is made as an elastic sheet having a dimension smaller than a volume of the accommodation space, and there is a space retained between at least one side of the elastic sheet and an interior surface of the accommodation space, forming at least one gap located in the interior of the accommodation space, at a center of a surface on at least one of the first sheet and the second sheet in the accommodation space forming a curved surface which forms a recess zone, and then the solid cushion substantially stays at a center of the accommodation space when the impact-resistant pad does not encounter stresses; and
   wherein a density of the solid cushion is within a range of 0.1~0.7 g/cm$^3$; an impact protection of the solid cushion is within a range of 3.9~32 (kN); and a water absorption of the solid cushion is within a range of 0%~8%.

2. The impact-resistant pad according to claim 1, wherein at least one of the first sheet and the second sheet is a cushioning sheet and a material or a structure of the cushioning sheet is different from a material or the structure of the cushion materials in the accommodation space.

3. The impact-resistant pad according to claim 1, wherein the density of the solid cushion is within a range of 0.4~0.7 g/cm$^3$; the impact protection of the solid cushion is within a range of 3.9~5.5 (kN); and the water absorption of the solid cushion is less than 4%.

* * * * *